United States Patent [19]
DiMaio

[11] 3,961,012
[45] June 1, 1976

[54] METHOD OF MAKING RESIN IMPREGNATED GLASS FIBER ARTICLE

[75] Inventor: Vincent DiMaio, Toledo, Ohio

[73] Assignee: Structural Plastics Incorporated, Toledo, Ohio

[22] Filed: Jan. 6, 1975

[21] Appl. No.: 539,022

[52] U.S. Cl. .............................. 264/257; 264/112; 264/266; 264/294; 264/310
[51] Int. Cl.² .................. B29D 3/02; B32B 5/02; B32B 5/16
[58] Field of Search ............ 264/257, 258, 266, 286, 264/254, 271, 109, 112, 299, 294, 310, 171; 425/87, 363, 385, 369, 115; 29/125, 130, 132; 156/462

[56] References Cited
UNITED STATES PATENTS

| | | | |
|---|---|---|---|
| 1,612,990 | 1/1927 | Silverstein et al. | 29/125 |
| 2,287,768 | 6/1942 | Eckstein | 29/125 |
| 2,811,745 | 11/1957 | Dowse et al. | 264/286 |
| 3,425,888 | 2/1969 | Kellicutt | 264/286 |
| 3,478,555 | 11/1969 | Achler et al. | 29/125 |
| 3,839,532 | 10/1974 | Drake | 264/257 |

*Primary Examiner*—Willard E. Hoag
*Attorney, Agent, or Firm*—James D. McNeil; Richard D. Emch

[57] ABSTRACT

A method for producing molded reinforced articles by contact molding is disclosed. The improved method involves working a resin-glass fiber composition into a reinforcing mat by rolling across the mat, along a longitudinally-extending axis spaced from the mat, laterally incremental forces to the mat. The forces are applied at different elevations laterally of the mat, depending on the configuration. As the forces are applied to the reinforcing mat, the height of resin flow laterally incrementally of the mat is also controlled.

2 Claims, 5 Drawing Figures

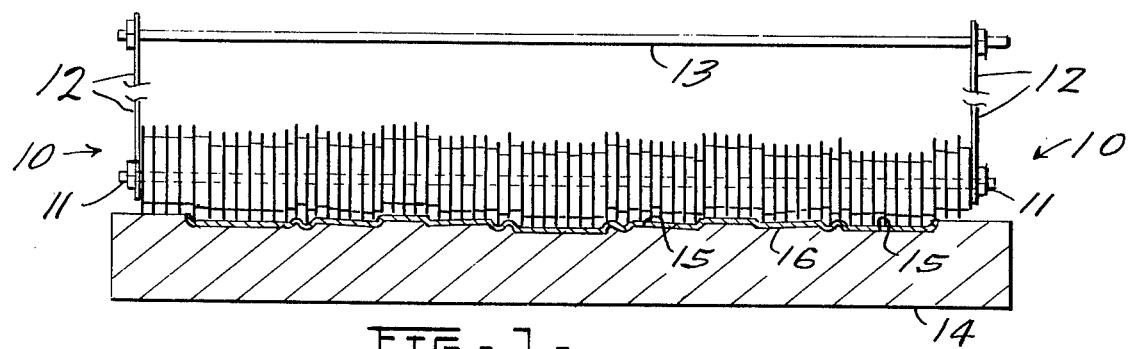
FIG-1-
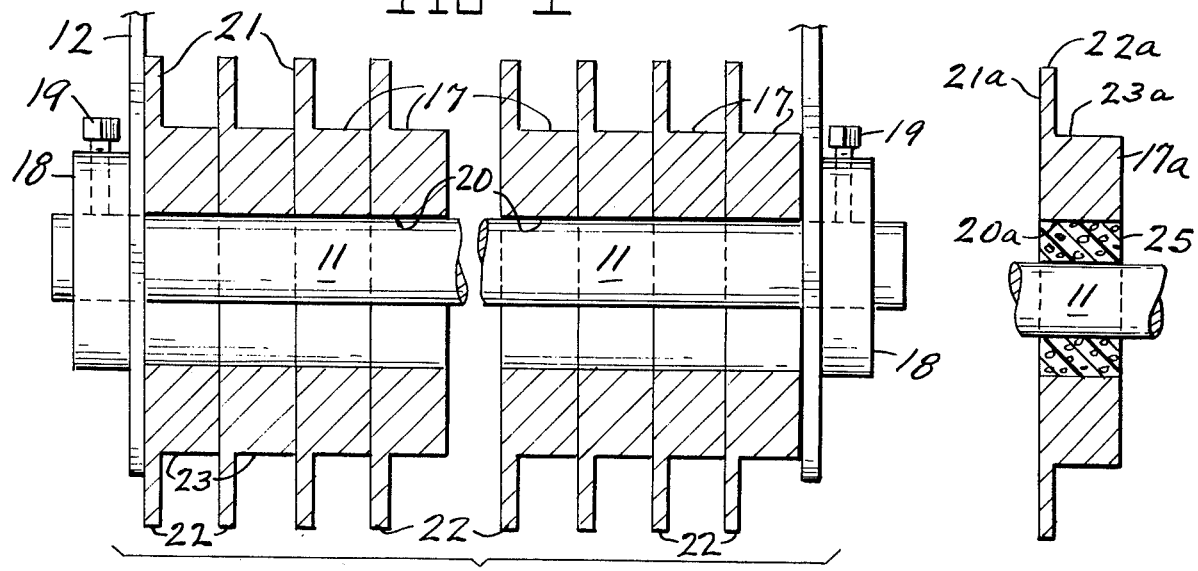
FIG-2-
FIG-5-
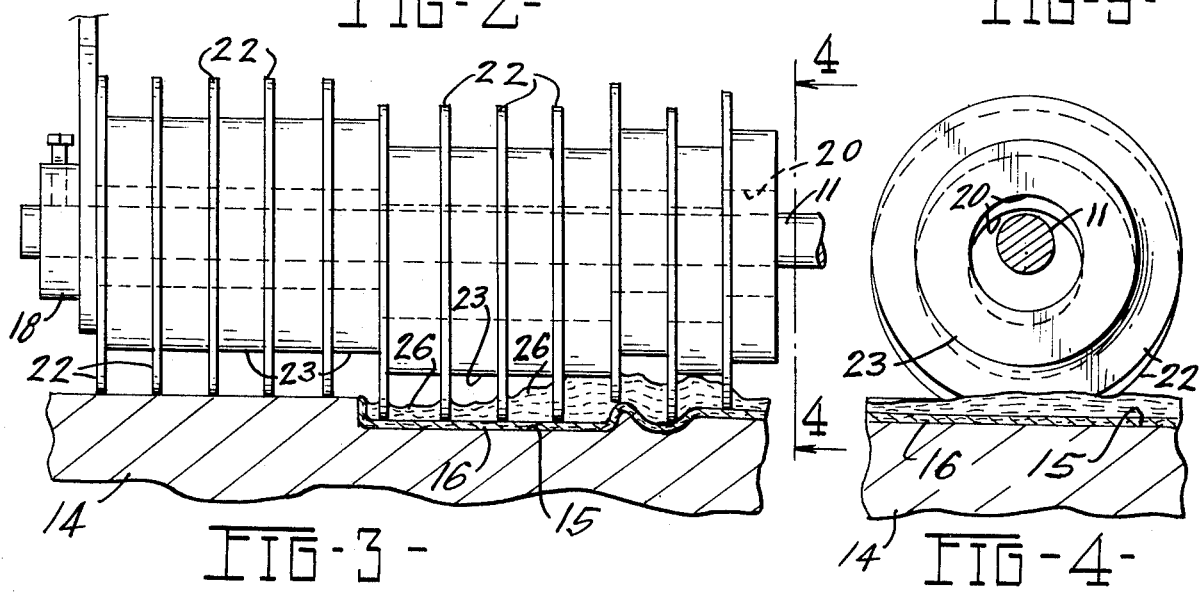
FIG-3-
FIG-4-

METHOD OF MAKING RESIN IMPREGNATED GLASS FIBER ARTICLE

BACKGROUND OF THE INVENTION

Fabricating methods used to produce molded reinforced polyester articles range from simple open mold fabrication, known as contact molding, to the matched-die method, one of the most advanced in terms of mechanization. The contact molding process is probably the oldest method of producing such reinforced structures and is still widely used where it is desirable to keep tooling costs to a minimum.

The contact molding process involves the use of a single mold conforming either to the outside or inside dimensions of the finished part. Usually the mold is first coated with a release agent to assure release of the molded part. Often a "gel-coat" of pigmented resin is applied to the surface of the mold and allowed to set. A reinforcing glass fiber mat, pre-formed to conform with the shape of a mold is placed within the mold and a pre-determined quantity of liquid polyester resin and chopped glass fibers is poured over the mat. The polyester resin-glass fibers can also contain a catalyst, associated fillers, pigments, etc. The resin-glass fiber mixture is then worked into the reinforcing mat.

To insure formation of a uniform product, the reinforcing mat must be completely wetted by the resin-glass fiber mixture. Whether the resin is applied by spraying, brushing or rolling, a considerable amount of hand-work is required to work the resin into the mat in a uniform manner. This hand-work operation is a source of problems; particular care must be taken to avoid entrapment of air bubbles in the reinforcing mat and polyester resin, and non-uniformity of the glass fiber-resin composition. Improper hand-work can cause an uneven distribution of the resin and chopped glass fibers wherein certain areas of the final product have a build-up of resin at the expense of the reinforcing fibers, resulting in a product having decreased structural strength.

After each layer of reinforcing material is put into position, additional resin and working are required. Because of the need to increase the speed of the operation, rolling of the resin mixture into the reinforcing fiber mat is desirable over brushing. However, if the rolling is done by a roller having a conventional configuration, wherein the outer surface of the roller is in contact with the reinforcing mat, as the roller is moved across the mold a build-up of excess resin occurs on the front part of the roller. As the roller continues in its movement across the mold, the build-up of the excess resin increases until the reinforcing mat is lifted off the mold surface. When this occurs, the reinforcing mat is torn and displaced, producing what is referred to in the molding business as "wash-out". These problems, associated with contact molding techniques, can be avoided of course by matched-die molding which generally involves the use of two dies — the male plug or force, and a female or cavity. Although the matcheddie process permits the use of fast production cycles with uniform construction, the high cost of the dies which are usually steel, cast iron or aluminum, and preferably chromeplated steel, is such that low production costs can only be achieved in the production of articles which are made in very large numbers. Consequently, there is a need for improvement of the contact molding process wherein the hand lay-up step can be conducted with increased speed, avoiding bubbles and "wash-out".

SUMMARY OF THE INVENTION

The present invention is directed to a method and apparatus for an improved contact molding process. As mentioned above, contact molding processes involve coating an open mold with a mold release agent, covering the mold with a gel-coat to help suppress undesirable fiber pattern, placing a reinforcing glass fiber mat into the mold and working a polyester resin-glass fiber composition into the reinforcing mat. The improved process and apparatus involves working the resin-glass fiber composition into the reinforcing mat by rolling across the mat, along a longitudinally-extending axis spaced from the mat, a plurality of laterally spaced contacting surfaces. These surfaces contact the mat and exert a pressure on the mat, pushing the mat into close contact with the mold configuration. A plurality of leveling surfaces, positioned between two contacting surfaces or adjacent an outer one of the contacting surfaces removes excess resin-glass fiber from the reinforcing mat. Each of contacting surfaces and an adjacent one of the leveling surfaces is reciprocable in a direction perpendicular to the mat.

It is, therefore, a primary object of the instant invention to provide a method for an improved contact molding process.

Another object of the instant invention is to provide apparatus for forming a reinforced polyester article by a contact molding process.

A still further object of the instant invention is to provide a method and apparatus wherein the hand layup process of working a polyester resin-glass fiber composition into a reinforcing mat is accomplished rapidly and economically.

BRIEF DESCRIPTION OF THE DRAWINGS

FIG. 1 is an elevational view of apparatus according to the present invention;

FIG. 2 is a cross sectional view of a portion of th apparatus shown in FIG. 1, showing the contact leveling surfaces in detail;

FIG. 3 is an enlarged elevational view of the apparatus of the invention showing the contact surfaces in contact with a contoured mat;

FIG. 4 is a sectional view along line 4—4 of FIG. 3 showing one contact and leveling surface; and FIG. 5 is a view showing an alternate embodiment of a roller.

DESCRIPTION OF THE PREFERRED EMBODIMENT

Contact molding apparatus 10 is shown in FIGS. 1 and 2 and is used to produce a reinforced polyester article as described hereinafter.

Generally, in producing a reinforced polyester article 11, an open mold conforming to the desired configuration is first coated with a mold release agent or parting agent to assure release of the molded part. The mold can be made from materials such as silicone or urethane rubber. Silicone molds are advantageous in that they require no release agent and are long lasting due to their high temperature resistance and chemical stability. Urethane molds presently cost much less than silicone molds, but require the use of a release agent. Urethane molds have a shorter life due in part to degradation from the catalyzation reaction. A gel coat of pigmented resin is applied to the surface of the mold and allowed to set. The gel coat, which is a thin outer layer of polyester resin, can include pigments, fillers, silica and tricresyl phosphate. The gel coat provides a tough abrasion-resistant surface which prevents fibers from blooming on the surface, and also suppresses fiber pattern and eliminates the need for further finishing. Additionally, the surface can be provided with special chemical, weathering and impact properties. For example, since silica crystals are highly polished, when the gel coat surface is scratched or scuffed, silica particles refract light impinging upon them and thus surface damage is less apparent. Fillers such as clays, for example, bentonite, are commonly added to the gel coat for economical reasons. Tricresyl phosphate can be added to the gel coat to provide a surface that is tack free when dry. Aluminum chlorhydrate can be added to substantially reduce the combustion rate.

If no gel coat is used, or after the gel coat has cured sufficiently, a reinforcing mat, pre-formed to fit within the mold confines, is placed in the mold surface. The reinforcing mat is then saturated with a polyester resin-glass fiber mixture, to completely wet the reinforcing mat. The resin can be initially applied to the mat by spraying, brushing or rolling. The use of the improved apparatus of the instant invention is described below.

Referring to FIG. 1, the contact molding apparatus 10 includes a longitudinally extending shaft 11, vertical support means including vertical arms 12 and horizontal support means comprising a handle rod 13 mounted at the upper ends of the arms 12. The lower ends of the arms 12 journal the shaft 11 with the longitudinal centerline of the shaft 11 and the handle rod 13 being parallel. A mold 14 has a non-planar surface configuration 15 and a reinforcing mat 16 placed over the surface configuration 15.

Referring to FIG. 2, a plurality of rollers 17 are mounted on the shaft 11 between the arms 12. Collars 18 having set screws 19 are mounted on the ends of the shaft 11. Each of the rollers 17 defines a central opening 20. The opening 20 has a diameter larger than the diameter of the shaft 11. The individual rollers 17 are radially movable relative to one another as shown in FIG. 3. In the present embodiment, the diameter of the shaft 11 is ¼ inch; the diameter of the openings 20 is about ⅞ inch. In general, the diameter of the shaft 11 should be from about one-sixth to one-half the diameter of the central opening 20. The diameter of the central opening 20 preferably does not exceed about 2 inches.

Each of the rollers 17 has a flange 21 which defines an outer contacting surface 22. The rollers 17 each have an outer or leveling surface 23. In the present embodiment, the width of the outer contacting surface is from about 1/64 inch to 3/32 inch; the leveling surface 23 has a width of from 1/32 inch to ¼ inch; the distance from the leveling surface 23 to the contacting surface 22 is from about 1/32 inch to ⅛ inch. As the mold configuration 15 increases in complexity and fineness of pattern, it becomes necessary to use rollers 17 having leveling surfaces 23 and contacting surfaces 22 of smaller dimensions. Conversely, as the mold configuration becomes less complex and has less fineness of detail to be reproduced during the molding process, the rollers 17 can have contacting surfaces 22 and leveling surfaces 23 of larger dimensions.

Each of the rollers 17 is movable in a direction perpendicular to the axis of the shaft 11. Furthermore, adjacent ones of the rollers 17 move independent of one another.

Referring to FIG. 5, another embodiment of a roller, according to the present invention is indicated by the reference number 17a. The roller 17a includes a flange 21a, a contacting surface 22a and a leveling surface 23a. However, an elastomeric sleeve 25 is positioned in the central opening 20a. The sleeve 25 receives the shaft 11. The sleeve 25 is resilient enough to allow shifting of the roller 17a in a manner similar to the FIG. 2 construction where a void is present adjacent the shaft 11.

Referring now to FIG. 3, the positions of contact surfaces 22 and leveling surfaces 23 are shown more clearly in relation to the non-planar mold surface configuration 15, wherein $x$ denotes the distance between the highest and lowest portions of the mold surface configuration 15 beneath the apparatus 10. As shown in FIG. 3, because the contacting surfaces 22 and leveling surfaces 23 are free to move in a direction perpendicular to the mat 16, movement of the shaft 11 in a direction parallel to the mold 14 causes the contact surfaces 22 to apply force to the reinforcing mat 16 against the mold 14 thereby producing the desired intimate contact between the mat 16 and the mold surface configuration 15. The contact surfaces 22 thus compact the fibers of the reinforcing mat 16. As the contact surfaces 22 exert pressure against the mold surface 15, excess resin 26 is pushed to the surface of the reinforcing mat 16. This bleeding-up of the resin 26 through the reinforcing mat 16 eliminates residual friction of the resin which in the prior art causes the reinforcing mat 16 to lift from the mold surface 15. As the resin 26 continues to build in height, the leveling surfaces 23 push the excess resin 26 along the surface of the reinforcing mat 16, leaving a controlled excess of resin 26 on the surface, as indicated in FIG. 3.

What I claim is:

1. In a method of molding a glass fiber reinforced polyester article including applying a liquid polyester resin and chopped glass fibers to a glass fiber mat on a mold surface and rolling said resin and chopped fibers into the mat and curing said resin, the improvement comprising: performing said rolling step with a roller having plural side-by-side roller segments disposed on a common shaft, each said segment being adapted to allow individual radial displacement of each said segments under rolling conditions, each said segment including a flange portion and a leveling surface portion adjacent to said flange portion, said leveling surface portion having a lesser diameter than said flange portion, said flange portion having a peripheral outer surface, said improvement further comprising contacting said resin and said glass fiber mat with the peripheral surface of each said flange and separately leveling lateral increments of said resin with said leveling surfaces and further permitting each said roller segment to be displaced individually in a direction perpendicular to said mat during rolling.

2. A method according to claim 1, including controlling the pressure exerted by each of the contacting surfaces.

* * * * *